United States Patent

[11] 3,584,558

| [72] | Inventor | Donald O. Easterly<br>Rush, N.Y. |
|---|---|---|
| [21] | Appl. No. | 795,467 |
| [22] | Filed | Jan. 31, 1969 |
| [45] | Patented | June 15, 1971 |
| [73] | Assignee | Eastman Kodak Company<br>Rochester, N.Y. |

[54] DEVICE FOR EXTENDING EXPOSURE RANGE OF A CAMERA
5 Claims, 2 Drawing Figs.

[52] U.S. Cl............................................. 95/64R, 352/141
[51] Int. Cl............................................. G03b 9/02, G03b 11/00
[50] Field of Search............................................. 95/64, 64 D; 352/141

[56] References Cited
UNITED STATES PATENTS

| re.26,390 | 5/1968 | Vess et al...................... | 95/64 (D) |
| 2,949,837 | 8/1960 | Baab ........................... | 95/64 |
| 3,033,093 | 5/1962 | Stimson et al. ................ | 95/64 (D) |
| 3,035,503 | 5/1962 | Lee .............................. | 95/64 (D) |

Primary Examiner—Samuel S. Matthews
Assistant Examiner—Joseph F. Peters, Jr.
Attorneys—Robert W. Hampton and William C. Dixon, III ABSTRACT: A device is provided to extend the exposure range of a camera, the camera having a diaphragm that is manually adjustable by an externally accessible control member to afford a plurality of aperture sizes. The device comprises a filter that is movable into the path of scene light when the diaphragm has been adjusted to its minimum-aperture condition. The filter is supported by a lever that is engaged by the externally accessible control member when the diaphragm is in its minimum-aperture condition for movement by the control member into the path of scene light to thereby attenuate said light and provide the equivalent of an even smaller diaphragm aperture. The device thus provides a means whereby unidirectional movement of the externally accessible control member by the camera operator effects a reduction in the amount of scene light admittable to film in the camera from a maximum amount corresponding to the maximum-size diaphragm aperture to a minimum amount corresponding to the minimum-size diaphragm aperture with the filter positioned in the path of scene light.

PATENTED JUN 15 1971 3,584,558

DONALD O. EASTERLY
INVENTOR.

BY *William C. Dixon, III*

*Robert W. Hampton*
ATTORNEYS

3,584,558

DEVICE FOR EXTENDING EXPOSURE RANGE OF A CAMERA

BACKGROUND OF THE INVENTION

1. Field of the Invention

This invention relates generally to cameras, and particularly to a device for extending the exposure range obtainable in such cameras.

2. Description of the Prior Art

It has long been known in the prior art to utilize a filter in the path of scene light entering a camera in order to obtain desired exposure conditions. For example, U.S. Pat. No. 2,289,133, issued July 7, 1942 in the name of L. W. Lessler et al. and entitled CAMERA WITH FILTER, discloses a mechanism wherein a filter is automatically positioned over the diaphragm opening when the camera is focused on distant objects and is automatically removed from the diaphragm opening when the camera is focused on nearby objects. For another example, U.S. Pat. No. 2,380,216, issued July 10, 1945 in the name of R. N. Carter and entitled LENS SYSTEM, discloses a lens system in which a neutral-density filter is inserted over a small aperture to minimize ghost images, the insertion being effected by manually positioning a slide-mounted filter between the lens elements or by actuating a relatively expensive cam or gear mechanism which, in turn, positions a filter between the lens elements. For still another example, U.S. Pat. No. 3,035,503, issued May 22, 1962 in the name of C.M. Lee and entitled AUTOMATIC EXPOSURE CONTROL FOR PHOTOGRAPHIC CAMERAS, discloses an automatic-exposure-control mechanism wherein the minimum area portion of an irregular-aperture diaphragm is covered by a neutral-density filter to attenuate scene light passing through said portion and thereby provide the equivalent of a smaller-sized aperture. In none of the prior art known to Applicant, however, is there taught, shown, or suggested, for relatively inexpensive cameras of the manual-exposure-control type, a simple, low-cost device whereby unidirectional movement of a manual control member by the camera operator effects reduction in the amount of scene light admittable to film in the camera by first adjusting a diaphragm to its minimum-aperture condition and then moving a filter into the path of scene light to provide the equivalent of an even smaller aperture without causing objectionable diffraction effects. Such a device is highly desirable to facilitate optimum use of such cameras at relatively little additional cost of manufacture.

SUMMARY OF THE INVENTION

Accordingly, an object of the present invention is to provide a simple, low-cost device for extending the exposure range of a camera whereby unidirectional movement of a manual control member by the camera operator effects reduction in the amount of scene light admittable to film in the camera by first adjusting a diaphragm to its minimum-aperture condition and then moving a filter into the path of scene light to provide the equivalent of an even smaller aperture without causing objectionable diffraction effects. Another object of the invention is to provide such a device for use particularly in amateur cinematographic camera in which there may be but a single running speed and no variable shutter, varying the effective lens-aperture size being the only means affording exposure control. A further object of the invention is to provide a device of the type described at a minimum cost of manufacture in order to realize the benefits obtainable from such a device in relatively inexpensive cameras.

To meet these and other objects, the present invention provides a simplified device for extending the exposure range of a camera of the type having means for focusing an image of a viewed scene onto a photosensitive surface. The device comprises diaphragm means adjustable from a first aperture condition to a second aperture condition for decreasing the amount of light transmitted to the photosensitive surface during exposure thereof; a manually operatable member movable from a first position through a second position to a third position; means for effecting adjustment of the diaphragm means from the first aperture condition to the second aperture condition in response to movement of the manually operatable member from the first position to the second position; a filter; a member supporting the filter and movable to position the filter in alignment with the diaphragm means to further decrease the light transmitted by the diaphragm means in the second aperture condition to effectively provide a third aperture condition; and abutment means on the manually operatable member engageable with the filter supporting member and operative to move the filter supporting member to position the filter in alignment with the diaphragm means in response to movement of the manually operable member from the second aperture position to the third aperture position.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENTS

Because certain parts of photographic and related apparatus are well known, the following description is directed in particular to those elements forming, or cooperating directly with, the present invention, elements that are not specifically shown or described herein being understood to be selectable from those those known in the art.

Figure 1:
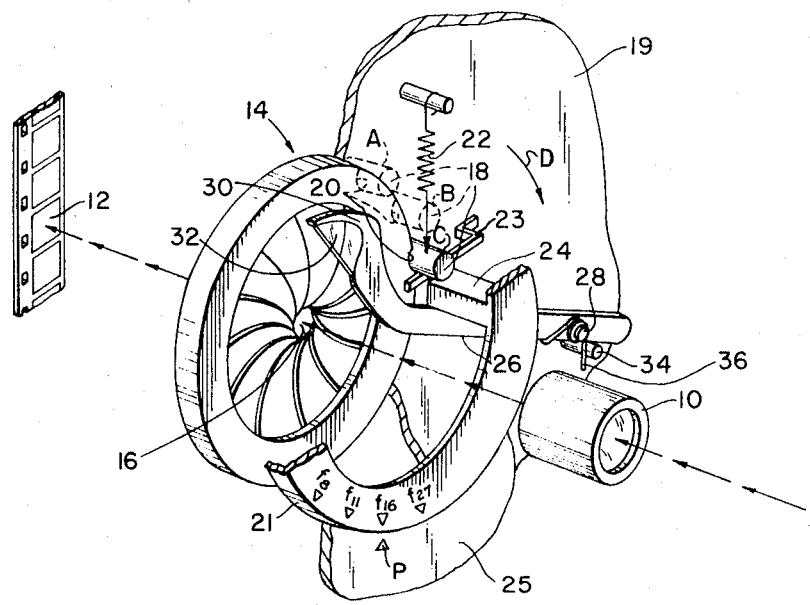
FIG. 1 is an exploded, fragmentary view, in perspective, of the preferred embodiment of the invention, showing a filter member in its position outside the path of scene light admittable to an associated photosensitive surface.
Figure 2:
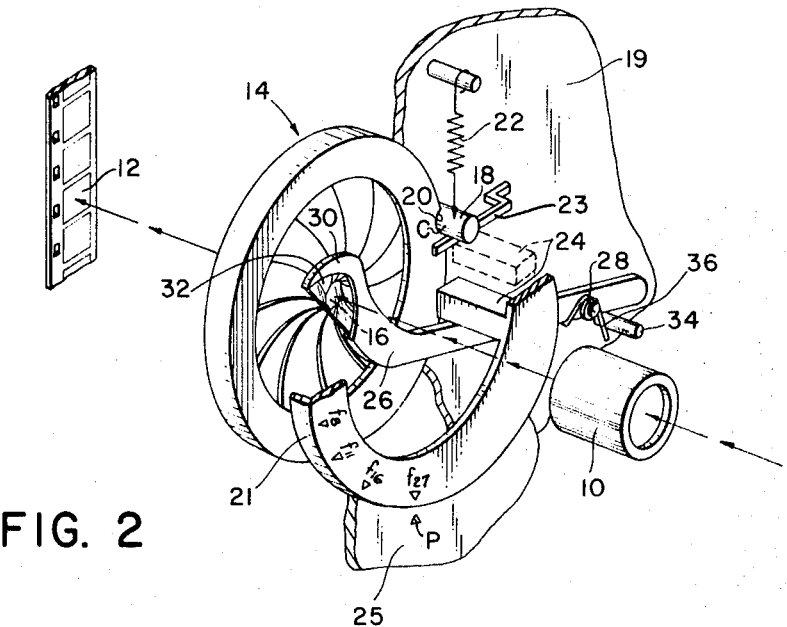
FIG. 2 is an exploded, fragmentary view, in perspective, of the preferred embodiment of the invention, similar to FIG. 1 but showing the filter member in its position after it has been moved into the path of scene light admittable to the associated photosensitive surface.

FIGS. 1 and 2 illustrate the preferred embodiment of the present invention as it could be incorporated in cinematographic camera of the manual-exposure-control type. Shown in FIGS. 1 and 2 is a lens assembly 10 for focusing an image of a viewed scene onto a photosensitive surface 12 received in the camera. Shown disposed in the optical path of scene light between lens assembly 10 and photosensitive surface 12 is a multiple-vane diaphragm 14 that is adjustable from a maximum-aperture condition (not shown) to a smaller-aperture condition (as shown) for varying the amount of scene light admittable to photosensitive surface 12 between a maximum amount and a smaller amount, respectively. Diaphragm 14 is shown in its smaller-aperture condition, wherein aperture 16 admits the smaller amount of scene light to photosensitive surface 12. Coupled to diaphragm 14 is a diaphragm adjusting member such as a pin or lug 18, shown engaged in recess 20 on the periphery of diaphragm 14. As illustrated, lug 18 is movable to any of three positions designated as A, B, and C. When lug 18 occupies position A, diaphragm 14 is adjusted to its maximum-aperture condition (not shown), as would be indicated by the matching of pointer P on the front wall 25 of the camera with the number $f/8$ on an externally accessible, manually movable adjusting ring 21. Similarly, when lug 18 occupies position B, diaphragm 14 is adjusted to an intermediate-aperture condition (not shown) corresponding to the matching of pointer P with the number $f/11$ on the adjusting ring. And when lug 18 occupies position C, diaphragm 14 is adjusted to its smaller-aperture condition, as shown in FIG. 1 and indicated by the matching of pointer P with the number $f/16$. Biasing lug 18 in a light-decreasing direction, indicated by the arrow D, is a spring 22, illustrated schematically.

Stopping movement of lug 18 in the direction of arrow D at position C is a stop pin 23 which may be fixed to the camera frame or housing 19. Suitable detent means (not shown) may be provided to be engaged by lug 18 to positively define positions A, B, and C. Also, as will be understood by those skilled in the art, additional stop positions may be provided without departing from the spirit of the invention.

Shown in FIG. 1 in abutting relationship with lug 18 at position C is a control member 24 projecting from the externally accessible, manually movable adjusting ring 21. By manually turning ring 21 clockwise, as viewed in FIG. 1, the camera operator can thus move control member 24 in the direction of arrow D to permit spring 22 to urge lug 18 in the direction of arrow D from position A to position C and thereby adjust diaphragm 14 from its maximum-aperture condition to its smaller-aperture condition. And by turning ring 21 counterclockwise, as viewed in FIG. 1, the camera operator can move control member 24 in the direction opposite to arrow D, in opposition to the biasing influence of spring 22, to adjust diaphragm 14 back toward its maximum-aperture condition. As mentioned above with reference to stop pin 23, lug 18 is at the end of its travel in the direction of arrow D when it occupies position C. Control member 24, however, is free to continue moving in the direction of arrow D, in response to continued clockwise rotation of ring 21 by the camera operator, from its position shown in FIG. 1, away from lug 18, to its position shown in FIG. 2. When control member 24 is occupying its position shown in FIG. 1, it engages, at its underside, a movable filter-supporting member such as lever 26. Lever 26, at one end, is pivotally mounted on the camera frame as at 28, and, at the other end 30, lever 26 is formed to support a filter 32. Upon the engagement of control member 24 with lever 26, when lug 18 is occupying position C, member 24 is operative to commence counterclockwise movement of lever 26, as viewed in FIGS. 1 and 2. Such movement of lever 26 is caused by continued clockwise rotation of ring 21 by the camera operator, resulting in continued downward movement of control member 24, thereby moving filter 32 from its position outside the path of scene light admittable to photosensitive surface 12, as shown in FIG. 1, to its position in the path of scene light, as shown in FIG. 2. With filter 32 thus placed in the path of scene light, the amount of scene light admittable to surface 12 is reduced to a minimum equivalent to that passing through a still smaller aperture such as an aperture corresponding to the number $f/27$, as indicated in FIG. 2 by the matching of pointer P with the number $f/27$ on ring 21. Shown urging lever 26 in a clockwise direction, as viewed in FIGS. 1 and 2, is a biasing means such as spring 36, so that, when control member 24 is moved form its position shown in FIG. 2 in the direction opposite to arrow D to effect an increase in the amount of light to be admitted to surface 12, lever 26 is urged upward, in the clockwise direction, to follow member 24 to its position, shown in FIG. 1, outside the path of scene light. Stopping clockwise movement of leer 26 at its position shown in FIG. 1 is a stop pin 34 fixed to the camera frame.

Thus it can be seen that the device of the present invention provides a novel, useful, and inexpensive way, by an arrangement of simple abutting members and springs, of extending the exposure range of a camera whereby continuous movement of a single, manually operatable control member in a light-decreasing direction effects reduction in the amount of scene light admittable to a photosensitve surface in the camera by first adjusting a diaphragm aperture to its minimum-aperture condition and then moving a filter into the path of scene light passing through the diaphragm aperture to attenuate said light to an amount equivalent to that passing through an even smaller aperture, thereby extending the range of exposure control beyond that attainable with the diaphragm alone, without causing the definition losses through diffraction effects that normally result from use of such a smaller aperture.

As should be apparent to those skilled in the art, a filter of either neutral or nonneutral density could be used to advantage in practicing the present invention. Similarly, the filter could be of either uniform density or nonuniform density. If of nonuniform density, the filter could have either a single area of gradually varying density or a plurality of areas of differing densities to provide a greater number of equivalent aperture sizes and hence afford a broader range of $f$-numbers.

The invention has been described in detail with particular reference to the preferred embodiment thereof, but it will be understood that variations and modifications can be effected within the spirit and scope of the invention.

I claim:

1. Exposure control means for controlling the amount of light from a scene that is provided along a light path to an exposure area of a camera, the exposure control means comprising:

a. adjustable diaphragm means located along the light path and adjustable through a range of conditions for controlling the amount of light from the scene that is provided to the exposure area of the camera;
    b. a filter mounted in the camera for movement between (1) a first position wherein the filter is spaced from the light path and (2) a second position wherein the filter is in alignment with the light path, said filter being effective when in the light path to decrease the amount of light transmitted to the exposure area of the camera; and
    c. means for controlling adjustment of the diaphragm means through its range of conditions and movement of the filter between its two positions, said controlling means comprising a control member manually movable from a first position through a second position to a third position, and means on said control member detachably coupled to said diaphragm means for adjusting the diaphragm means during movement of the control member from its first position through its second position, said control member being coupled to said filter during movement of the control member from its second position to its third position thereby to effect movement of the filter from its first position to its second position, and means for preventing movement of said diaphragm means during movement of said control member from its second position to its third position.

2. In a camera adapted to receive a member having a photosensitive surface, the camera having means for directing an image of a scene through the camera along a light path having an optical axis and onto the surface, the combination comprising:

a. adjustable diaphragm means located along the light path and adjustable through a range of conditions for controlling the amount of light form the scene that is provided to the surface;
    b. stop means carried by the camera for limiting further movement of the diaphragm means in one direction at one end of its range of conditions;
    c. filter;
    d. a member supporting said filter for movement between (1) a first position wherein the filter is spaced from the light path and (2) a second position wherein the filter is in alignment with the light path and wherein the filter is effective to decrease the amount of light transmitted to the surface; and
    e. manually operable means for adjusting said diaphragm means and said filter including a manually movable control member, said control member being operatively coupled to said diaphragm means during adjustment of said diaphragm means and being movable independently of said diaphragm means after said diaphragm means reaches said one end of its range of conditions, said control member being operatively coupled to said member supporting said filter after the diaphragm means has been stopped by the stop means for moving said filter supporting member and thereby moving the filter from its first position to its second position.

3. The combination set forth in claim 2 further comprising means coupled to said diaphragm means for biasing the diaphragm means toward said one end of its range of conditions, said control member being effective to move said diaphragm means away from said one end of its range of conditions in opposition to the influence of said biasing means.

4. The combination as set forth in claim 2 further comprising means operatively connected to said filter supporting member for biasing said filter supporting member and said filter in a direction for moving the filter to its first position.

5. The combination as set forth in claim 2 wherein said filter is a neutral-density filter.